United States Patent
Kim et al.

(10) Patent No.: US 12,501,839 B2
(45) Date of Patent: Dec. 16, 2025

(54) SUPERCONDUCTING QUBIT AND DEVICE INCLUDING THE SAME

(71) Applicant: Samsung Electronics Co., Ltd., Suwon-si (KR)

(72) Inventors: Dae Yun Kim, Suwon-si (KR); Dae Seok Han, Suwon-si (KR); Kyung Mee Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 18/414,001

(22) Filed: Jan. 16, 2024

(65) Prior Publication Data

US 2024/0423101 A1 Dec. 19, 2024

(30) Foreign Application Priority Data

Jun. 15, 2023 (KR) .......................... 10-2023-0076974

(51) Int. Cl.
| | |
|---|---|
| *H10N 60/12* | (2023.01) |
| *G06N 10/40* | (2022.01) |
| *H01P 7/08* | (2006.01) |
| *H10N 60/82* | (2023.01) |
| *H10N 60/85* | (2023.01) |

(52) U.S. Cl.
CPC ............. *H10N 60/12* (2023.02); *G06N 10/40* (2022.01); *H01P 7/082* (2013.01); *H10N 60/82* (2023.02); *H10N 60/85* (2023.02)

(58) Field of Classification Search
CPC ..................................................... H10N 60/12

USPC .......................................................... 327/528
See application file for complete search history.

(56) References Cited

U.S. PATENT DOCUMENTS

| | | | |
|---|---|---|---|
| 8,270,209 B2 | 9/2012 | Herr et al. | |
| 8,971,977 B2 | 3/2015 | Mukhanov et al. | |
| 9,013,916 B2 | 4/2015 | Naaman et al. | |
| 10,741,744 B2 * | 8/2020 | Moodera | H10N 60/12 |
| 2020/0250567 A1 | 8/2020 | Yu et al. | |
| 2021/0279631 A1 | 9/2021 | Pichler et al. | |
| 2022/0399890 A1 | 12/2022 | Archambault et al. | |

(Continued)

FOREIGN PATENT DOCUMENTS

| | | |
|---|---|---|
| EP | 2 564 390 B1 | 2/2019 |
| JP | 2021-536610 A | 12/2021 |
| JP | 2022-135061 A | 9/2022 |

OTHER PUBLICATIONS

Linder et al. "Superconducting Spintronics with Magnetic Domain Walls" *Physical Review B* vol. 90 No. 10, Jan. 22, 2014 (pp. 1-7).

(Continued)

*Primary Examiner* — Tomi Skibinski
(74) *Attorney, Agent, or Firm* — NSIP Law

(57) ABSTRACT

A superconducting qubit-based device includes: a superconducting qubit comprising a first conductive pad and a second conductive pad, each being formed of a superconducting material, and a ferromagnetic body configured to form a Josephson junction with the first conductive pad and the second conductive pad; a conducting wire spaced apart from the ferromagnetic body by a predetermined distance; and a control circuit configured to control a resonance frequency of the superconducting qubit by controlling a current flowing through the conducting wire.

20 Claims, 10 Drawing Sheets

(56) References Cited

U.S. PATENT DOCUMENTS

2023/0068284 A1 3/2023 Phung et al.

OTHER PUBLICATIONS

Rabinovich et al. "Resistive state of SFS Josephson junctions in the presence of moving domain walls" *Physical Review Letters* vol. 123 No. 20, Nov. 18, 2019 (pp. 1-8).

\* cited by examiner

SUPERCONDUCTING QUBIT AND DEVICE INCLUDING THE SAME

CROSS-REFERENCE TO RELATED APPLICATIONS

This application claims the benefit under 35 USC § 119 (a) of Korean Patent Application No. 10-2023-0076974, filed on Jun. 15, 2023 in the Korean Intellectual Property Office, the entire disclosure of which is incorporated herein by reference for all purposes.

BACKGROUND

1. Field

The following description relates to a superconducting qubit using a ferromagnetic body and a superconducting qubit-based device including the same.

2. Description of Related Art

Quantum computers are computational machinery that may use quantum mechanical phenomena, such as quantum superposition and quantum entanglement, as operating principles to perform data processing. A unit element capable of storing information using a quantum mechanical principle, or the information itself, may be called a quantum bit or qubit, which may be used as a basic unit of information in a quantum computer.

Qubits may be implemented in various types, such as photon qubits, ion trap qubits, topology qubits, superconducting qubits, and the like.

A qubit may have a unique resonance frequency, and control of the resonance frequency of a qubit may affect quantum computing.

In the case of a superconducting qubit, the resonance frequency of the qubit may be controlled using a magnetic field. However, the resonance frequency of the superconducting qubit may be susceptible to magnetic flux noise caused by a magnetic field.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one or more general aspects, a superconducting qubit-based device includes: a superconducting qubit comprising a first conductive pad and a second conductive pad, each being formed of a superconducting material, and a ferromagnetic body configured to form a Josephson junction with the first conductive pad and the second conductive pad; a conducting wire spaced apart from the ferromagnetic body by a predetermined distance; and a control circuit configured to control a resonance frequency of the superconducting qubit by controlling a current flowing through the conducting wire.

The ferromagnetic body may include a magnetic domain wall.

The control circuit may be configured to move the magnetic domain wall by controlling the current flowing through the conducting wire to produce a magnetic field greater than or equal to a predetermined critical value.

The control circuit may be configured to control the resonance frequency by generating the magnetic field greater than or equal to the predetermined critical value using a model that defines a relationship between a position of the magnetic domain wall and a critical current and a model that defines a relationship between the critical current and the resonance frequency of the superconducting qubit.

The control circuit may be configured to generate a magnetic field in the form of a pulse by controlling the current flowing through the conducting wire.

The conducting wire may be spaced apart from the first conductive pad and the second conductive pad by a predetermined distance, and the conducting wire may be positioned between the first conductive pad and the second conductive pad.

The superconducting material may include any one or any combination of any two or more of aluminum (Al), niobium (Nb), indium (In), alpha-tantalum ($\alpha$-Ta), titanium (Ti), lead (Pb), vanadium (V), and compounds thereof.

The ferromagnetic body may include any one or any combination of any two or more of Pt/Co/MgO, Pt/Co/AlOx, Pt/CoFeB/MgO, Pt/(Co/Ni)n, and Pt/(Co/Pt)n.

The superconducting qubit may be a transmon-type qubit.

The superconducting qubit may be used as a qubit coupler.

Either one or both of the first conductive pad and the second conductive pad may have a thickness of 50 nm or more and 400 nm or less.

The superconducting qubit, the conducting wire, and the control circuit may be formed in a layered structure.

In one or more general aspects, a method of controlling a resonance frequency using a superconducting qubit-based device, wherein the superconducting qubit-based device may include a superconducting qubit comprising a ferromagnetic body configured to form a Josephson junction with a first conductive pad and a second conductive pad, and a conducting wire includes: applying a current to the conducting wire such that a magnetic field greater than or equal to a predetermined critical value is generated; and controlling a resonance frequency of the superconducting qubit by moving a magnetic domain wall in the ferromagnetic body according to the application of the current.

The applying of the current may include applying the current such that a magnetic field in the form of a pulse is generated.

The controlling of the resonance frequency may include controlling the resonance frequency using a model that defines a relationship between a position of the magnetic domain wall and a critical current and a model that defines a relationship between the critical current and the resonance frequency of the superconducting qubit.

In one or more general aspects, a superconducting qubit includes: a first conductive pad and a second conductive pad, each being formed of a superconducting material; and a ferromagnetic body configured to form a Josephson junction with the first conductive pad and the second conductive pad.

The ferromagnetic body may include a magnetic domain wall.

The magnetic domain wall may be moved by a current flowing through a conducting wire spaced apart from the ferromagnetic body by a predetermined distance.

The magnetic domain wall may be moved when an intensity of a magnetic field generated by the current flowing through the conducting wire is greater than or equal to a predetermined critical value.

A superconducting qubit-based device may include: the superconducting qubit; a conducting wire spaced apart from the ferromagnetic body; and a control circuit configured to control a resonance frequency of the superconducting qubit by controlling a current flowing through the conducting wire.

Other features and aspects will be apparent from the following detailed description, the drawings, and the claims.

Figure 1:
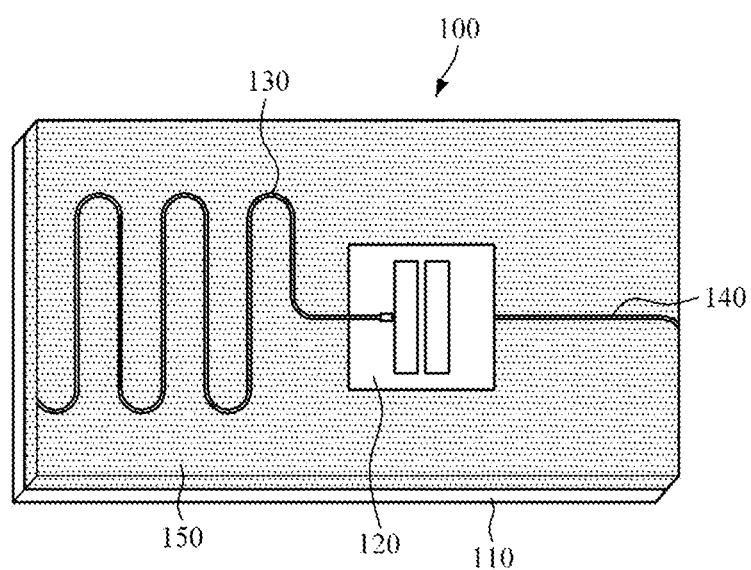
FIG. 1 is a diagram illustrating a schematic structure of a computing device including a superconducting qubit-based device according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above"

or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

As used in connection with various example embodiments of the disclosure, any use of the terms "module" or "unit" means hardware and/or processing hardware configured to implement software and/or firmware to configure such processing hardware to perform corresponding operations, and may interchangeably be used with other terms, for example, "logic," "logic block," "part," or "circuitry". As one non-limiting example, an application-predetermined integrated circuit (ASIC) may be referred to as an application-predetermined integrated module. As another non-limiting example, a field-programmable gate array (FPGA) or an application-specific integrated circuit (ASIC) may be respectively referred to as a field-programmable gate unit or an application-specific integrated unit. In a non-limiting example, such software may include components such as software components, object-oriented software components, class components, and may include processor task components, processes, functions, attributes, procedures, subroutines, segments of the software. Software may further include program code, drivers, firmware, microcode, circuits, data, database, data structures, tables, arrays, and variables. In another non-limiting example, such software may be executed by one or more central processing units (CPUs) of an electronic device or secure multimedia card.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The use of "the" and other demonstratives similar thereto may correspond to both a singular form and a plural form.

Steps of a method may be performed in any appropriate order unless there is no explicit mentioning that the steps have to be performed in the order they described. The use of all exemplary terms (e.g., "etc.," "and (or) the like," and "and so forth") is merely intended to describe technical spirit in detail, and the scope is not necessarily limited by the examples or exemplary terms unless defined by the claims.

FIG. 1 is a diagram illustrating a schematic structure of a computing device including a superconducting qubit-based device according to an embodiment, and FIGS. 2A to 2D are diagrams illustrating a structure of a superconducting qubit-based device or a superconducting qubit in a superconducting qubit-based device according to an embodiment.

Referring to FIG. 1, a computing device 100 including a superconducting qubit-based device may include a substrate 110, a superconducting qubit-based device 120, a readout circuit 130, a qubit control circuit 140, and a ground plane 150.

The substrate 110 may be a general silicon substrate, and may be a silicon-on-insulator (SOI) substrate, a sapphire substrate, or other insulating substrates made of various materials, other than a silicon substrate.

The readout circuit 130 may be a circuit that is electromagnetically connected to the superconducting qubit-based device 120 to provide state information (e.g., energy state) of the qubit, and may include one or more readout resonators.

The qubit control circuit 140 may be a circuit that is electromagnetically connected to the superconducting qubit-based device 120 to control the qubit, and may control the qubit using, for example, a radio frequency (RF) transmission circuit. However, the qubit control circuit 140 is not limited thereto.

The ground plane 150 may be a wiring layer used for grounding and may consist of a superconducting material deposited to the same thickness as the readout circuit 130 and the qubit control circuit 140 on the substrate 110. In a non-limiting example, each of the readout circuit 130 and the qubit control circuit 140 may be or include one or more processors.

Figure 2A:
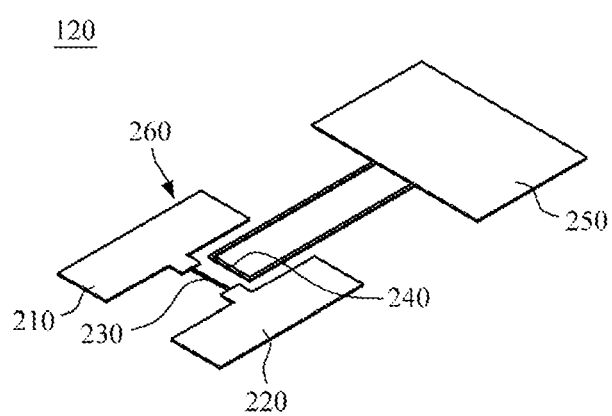
FIGS. 2A to 2D are diagrams illustrating a structure of a superconducting qubit-based device or a superconducting qubit in a superconducting qubit-based device according to an embodiment.
Figure 2B:
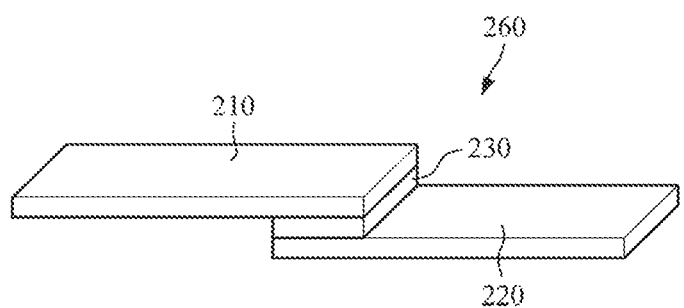
Figure 2C:
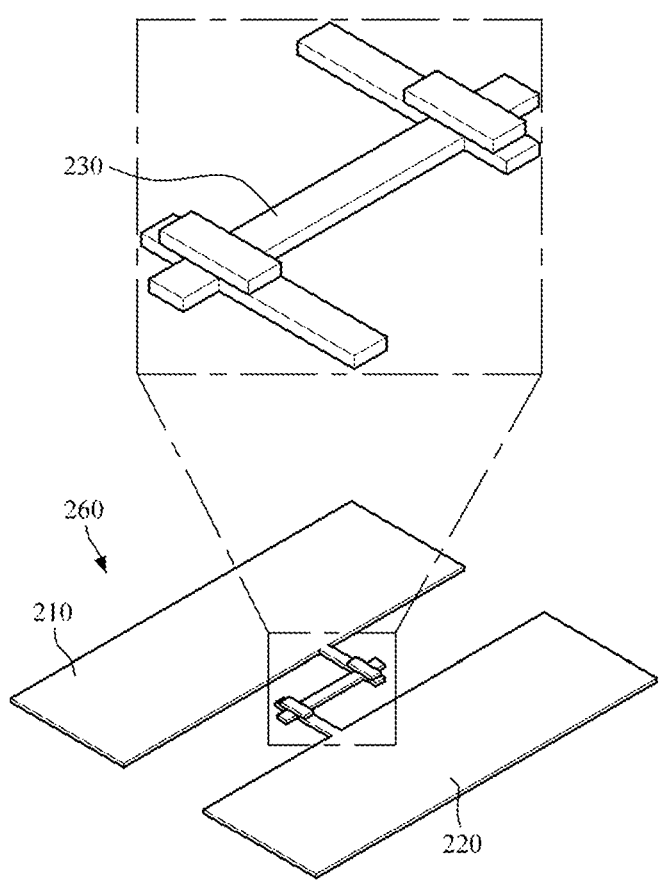

Referring to FIGS. 2A to 2D, the superconducting qubit-based device 120 may include a superconducting qubit 260, a conducting wire 240, and a control circuit 250. The superconducting qubit 260 may include a first conductive pad 210, a second conductive pad 220, and a ferromagnetic body 230. The first conductive pad 210, the second conductive pad 220, and the ferromagnetic body 230 may be arranged in a plane on the substrate as shown in FIGS. 2A and 2C, and may also be hierarchically arranged, as shown in FIG. 2B. However, the arrangement of the first conductive pad 210, the second conductive pad 220, and the ferromagnetic body 230 is not limited thereto.

The first conductive pad 210 and the second conductive pad 220 may each be formed of a superconducting material. For example, the first conductive pad 210 and the second conductive pad 220 may all be formed of the same or different superconducting materials. The superconducting material may include at least one of aluminum (Al), niobium (Nb), indium (In), alpha-tantalum ($\alpha$-Ta), titanium (Ti), lead (Pb), vanadium (V), or compounds thereof (e.g., NbN, NbTiN, TliN, and VN), but is not limited thereto.

An appropriate specific thickness should be ensured to achieve superconductivity in a pad. Thus, the first conductive pad 210 and the second conductive pad 220 may be formed to a thickness of, for example, 50 nm or more and 400 nm or less.

The ferromagnetic body 230 may be positioned between the first conductive pad 210 and the second conductive pad 220, and may form a Josephson junction with the first conductive pad 210 and the second conductive pad 220.

The Josephson effect may refer to a phenomenon in which current flows through a thin insulator which is placed between, for example, two superconducting materials, and a Josephson junction may be a weak link between two superconducting materials bonded with an insulator.

For example, various types of metals as well as insulators may be used as materials used for the weak link to form the Josephson junction, and a ferromagnetic body may also be used.

A ferromagnetic body may refer to a material in which the magnetic moments or magnetizations of atoms are aligned in a specific direction even in the absence of an external magnetic field. Magnetizations in a ferromagnetic body may be oriented in a specific preferred direction, which is called magnetic anisotropy. Taking a ferromagnetic thin film as an example, when the ferromagnetic thin film has perpendicular magnetic anisotropy, the magnetization of the ferromagnetic body may prefer to be aligned perpendicular to the thin film (e.g., positive or negative Z-axis direction). When the ferromagnetic thin film has in-plane magnetic anisotropy, the magnetization of the ferromagnetic body may prefer to be aligned parallel to the thin film (e.g., XY plane direction). The ferromagnetic body may have a heterojunction structure of a heavy metal (e.g., Pt, Ta, or W), a ferromagnet material (e.g., Co, CoFeB, (CoNi)n, or (CoPt)n), and an oxide layer (e.g., MgO, AlOx, or TaOx), and may include at least one of, for example, Pt/Co/MgO, Pt/Co/AlOx, Pt/CoFeB/MgO, Pt/(Co/Ni)n, or Pt/(Co/Pt)n.

The ferromagnetic body 230 according to an embodiment may include a magnetic domain wall.

Figure 3:
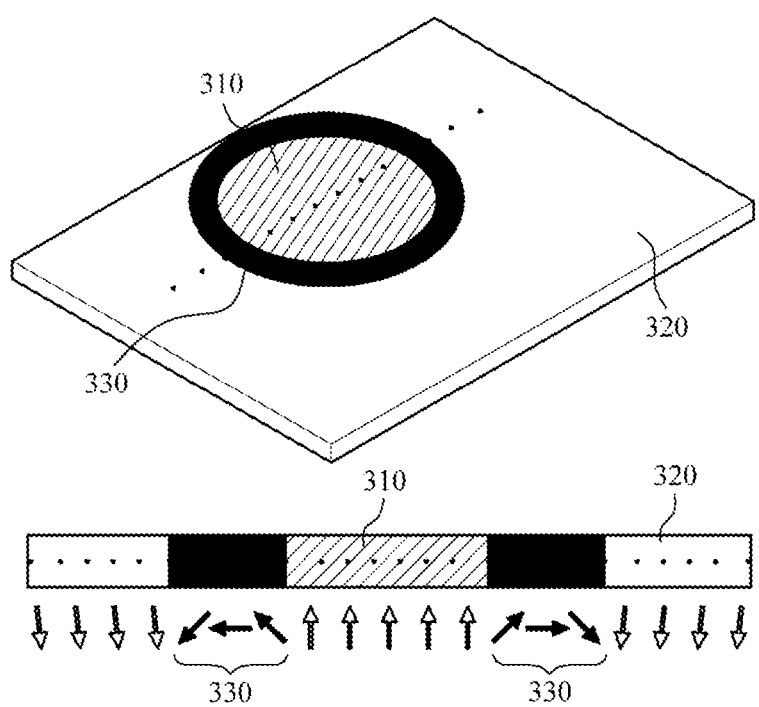
FIG. 3 is a diagram for explaining a ferromagnetic body including a magnetic domain wall according to an embodiment.

FIG. 3 is a diagram for explaining a ferromagnetic body including a magnetic domain wall. FIG. 3 illustrates a ferromagnetic body having perpendicular magnetic anisotropy, but the embodiment is not limited thereto.

The magnetization in a ferromagnetic body may prefer to orient in an upward or downward direction due to perpendicular magnetic anisotropy. The magnetizations aligned in an upward direction may tend to gather together, and the magnetizations aligned in a downward direction may tend to gather together. A region where the magnetizations are aligned in the same direction may be referred to as a magnetic domain.

Referring to FIG. 3, when a predetermined external magnetic field is applied to the ferromagnetic body (e.g., the ferromagnetic body 230), an upward magnetic domain 310 in which the magnetizations are aligned in the upward direction and a downward magnetic domain 320 in which the magnetizations are aligned in the downward direction may be generated, and a magnetic domain wall 330, which is a boundary between the upward magnetic domain 310 and the downward magnetic domain 320, may be generated. In an example, the thickness of the magnetic domain wall 330 may be in the range of, for example, several nanometers to several tens of nanometers, but is not limited thereto. In addition, due to the characteristics of the ferromagnetic body, the generated magnetic domain wall 330 may be maintained even when the external magnetic field dissipates, and may be movable when a magnetic field greater than or equal to a predetermined critical value is applied according to the type of the ferromagnetic body.

Referring back to FIG. 2A, the superconducting qubit-based device 120 may include the conducting wire 240 and the control circuit 250 configured to control current flowing through the conducting wire.

The conducting wire 240 may be a wire through which current flows, and may be spaced apart from the ferromagnetic body 230 by a predetermined distance (e.g., 50 μm or less) in order to apply a magnetic field generated by the current to the ferromagnetic body 230. In addition, the conducting wire 240 may be positioned between the first conductive pad 210 and the second conductive pad 220, and may be spaced apart from the first conductive pad 210 and the second conductive pad 220 by a predetermined distance (e.g., 10 μm). However, the spacing distance of the conducting wire 240 to the ferromagnetic body 230, the first conductive pad 210, and the second conductive pad 220 is not limited to the above examples.

Figure 2D:
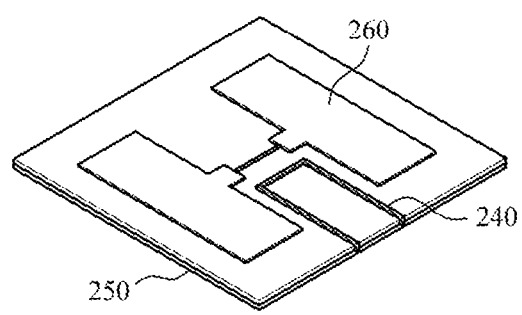

The control circuit 250 may control current flowing through the conducting wire 240, and may control a resonance frequency of the superconducting qubit based thereon. In an example, the superconducting qubit 260, the conducting wire 240, and the control circuit 250 may be disposed on the same plane as shown in FIG. 2A. Also, in an example as shown in FIG. 2D, a layered structure may be used such that the conducting wire 240 and the control circuit 250 are disposed below the superconducting qubit 260 (e.g., on the same plane) and the superconducting qubit 260 is disposed there above.

The control circuit 250 may move the magnetic domain wall 330 in the ferromagnetic body 230 by controlling the current flowing through the conducting wire 240 to produce a magnetic field greater than or equal to a predetermined critical value.

Figure 4:
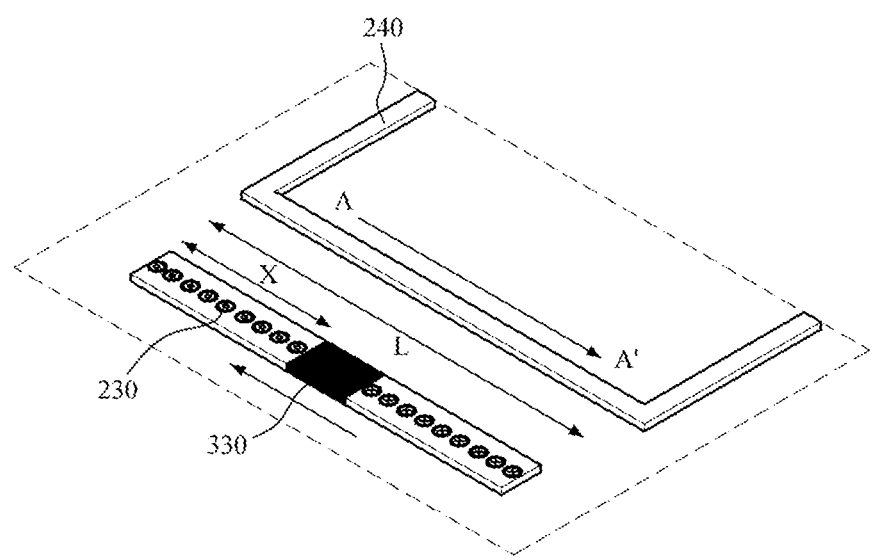
FIG. 4 is a diagram for explaining a movement of a magnetic domain wall in a ferromagnetic body by a current flowing through a conducting wire.

FIG. 4 is a diagram for explaining a movement of a magnetic domain wall in a ferromagnetic body by a current flowing through a conducting wire.

Referring to FIG. 4, a superconducting qubit-based device 120 may include a ferromagnetic body 230 that includes a portion ⊙ where the magnetizations are aligned upward by the application of a predetermined magnetic field, a portion ⊗ where the magnetizations are aligned downward, and a magnetic domain wall 330. In an example, when the control circuit 250 applies a current of a predetermined intensity in the A-A' direction to the ferromagnetic body 230 through the conducting wire 240, a magnetic field caused by the current is applied to the lower portion of the ferromagnetic body 230 according to Ampere's right-handed screw rule, and accordingly, the portion ⊗ where the magnetizations are aligned downward may be parallel to the applied magnetic filed such that the energy of the portion ⊗ can be relatively stable compared to the portion ⊙ where the magnetizations are aligned upward. Energy may move from an unstable region to a stable region, and thus atoms present in the portion ⊙ where the magnetizations are aligned upward tend to orient their magnetization to the relatively stable lower portion. As a result, the magnetic domain wall may move in the A'-A direction opposite to the direction of current flow.

In an example, in view of the characteristics of the ferromagnetic body 230 in which the magnetic domain wall 230 moves when a magnetic field greater than or equal to a critical value determined according to the type of the ferromagnetic body is applied, the control circuit 250 may control the current flowing through the conducting wire 240 such that a magnetic field greater than or equal to a predetermined critical value (e.g., 10 mT) is produced. In one or more embodiments, the control circuit 250 may move the magnetic domain wall 230 by controlling the current flowing through the conducting wire 240 to produce a magnetic field greater than or equal to a critical value in the form of a pulse. Accordingly, the control circuit 250 may move the magnetic domain wall 330 without continuous application of the current. However, the method of moving the magnetic domain wall by the current control of the control circuit 250 is not limited thereto.

FIG. 4 illustrates an example where the ferromagnetic body has perpendicular magnetic anisotropy, but as described above, the ferromagnetic body may have in-plane magnetic anisotropy and the magnetic domain wall of the ferromagnetic body may be moved by changing the positions of the conducting wire and the control circuit.

The control circuit 250 may control the resonance frequency by producing a magnetic field greater than or equal to a predetermined critical value by using a model that defines a relationship between the position of the magnetic domain wall 330 and critical current and a model that defines a relationship between the critical current and the resonance frequency of the superconducting qubit 260.

For example, the control circuit 250 may control the critical current according to the movement control of the magnetic domain wall 330 by using the model that defines the relationship between a predetermined position of the magnetic domain wall 330 and the critical current, and may control the resonance frequency according to the control of the critical current by using the model that defines the relationship between a predetermined critical current and the resonance frequency. For example, the control circuit may move the magnetic domain wall 330 by controlling the current flowing through the conducting wire 240, thereby ultimately controlling the resonance frequency.

Critical current $I_C$ may refer to a maximum value of current that can flow through an object that corresponds to a weak link in a Josephson junction, and may correspond to a parameter that determines the resonance frequency of the superconducting qubit 260. Hereinafter, a model that defines a relationship between critical current and a resonance frequency may be created with reference to Equations 1 and 2 below, for example, and the resonance frequency of the superconducting qubit 260 may be obtained from measured critical current according to the model.

$$E_J = I_C \cdot (\Phi_0/2\pi) \quad \text{Equation 1}$$

$$f_{Qubit} = (\sqrt{8E_J E_C} - E_C)/\hbar \quad \text{Equation 2}$$

Here, $I_C$ denotes critical current, $f_{Qubit}$ denotes a qubit resonance frequency, $E_j$ is a Josephson junction energy, $\phi_0$, denotes a predetermined magnetic flux passing through a qubit, Ec denotes a charging energy of the qubit, and h denotes the Planck constant.

Figure 5:
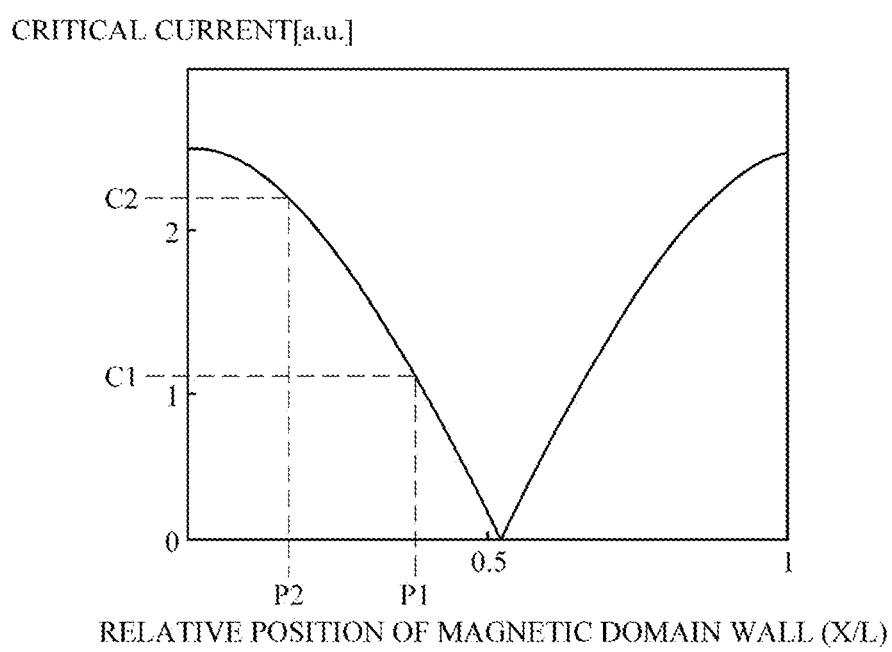
FIG. 5 is a graph showing a relationship between a position of a magnetic domain wall and critical current in a ferromagnetic body.

FIG. 5 is a graph showing a relationship between a position of a magnetic domain wall and critical current in a ferromagnetic body.

Referring to FIGS. 4 and 5, the X-axis of FIG. 5 represents a relative position of the magnetic domain wall 330 in the ferromagnetic body 230 (for example, a ratio (X/L) of a length X of the portion ⊙ where the magnetizations are aligned upward to the total length L of the ferromagnetic body 230) and the Y-axis represents the critical current of the ferromagnetic body 230. A relational model between the position of the magnetic domain wall 330 and the critical current may be derived based on the graph of FIG. 5.

When the control circuit 250 moves the relative position of the magnetic domain wall 330 from P1 to P2 by controlling current, the critical current may be changed from C1 to C2, and then the resonance frequency for the critical current may be changed from C1 to C2 by using the model that defines the relationship between the critical current and the resonance frequency.

Meanwhile, the control circuit 250 may directly obtain a change in resonance frequency according to the movement of the magnetic domain wall 330 by using the model that defines the relationship between the predetermined position of the magnetic domain wall 330 and the resonance frequency.

Figure 6:
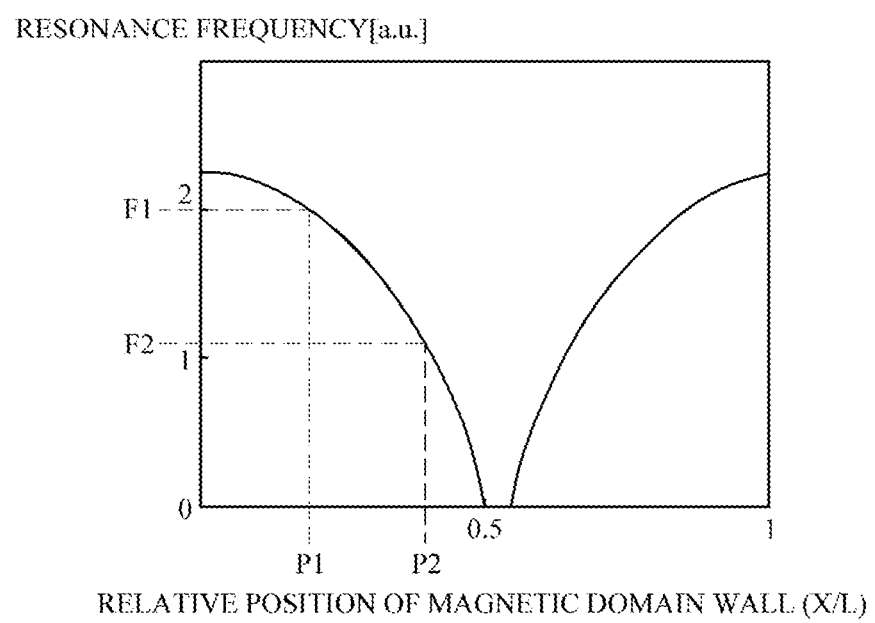
FIG. 6 is a graph showing a relationship between a position of a magnetic domain wall and a resonance frequency in a ferromagnetic body.

FIG. 6 is a graph showing a relationship between a position of a magnetic domain wall and a resonance frequency in a ferromagnetic body. A relational model between the position of the magnetic domain wall 330 and the resonance frequency may be directly derived based on the graph of FIG. 6.

Referring to FIG. 6, when the control circuit 250 moves the relative position of the magnetic domain wall 330 from P1 to P2, the resonance frequency of the superconducting qubit 260 may be changed from F1 to F2. In a non-limiting example, the control circuit 250 may be or include one or more processors.

The superconducting qubit 260 may be a transmon-type qubit. The transmon-type qubit may be a qubit configured with a high ratio of Josephson energy to charge energy to reduce susceptibility to charge noise. A Josephson junction may be formed by disposing a ferromagnetic body between shunt capacitors that correspond to a first conductive pad and a second conductive pad, each being formed of a superconducting material. The type of the superconducting qubit 260 may be not only a transmon type but also a charge type, a phase type, a fluxonium type, and the like, but is not limited thereto.

Also, the superconducting qubit 260 may be used as a qubit coupler.

The qubit coupler may be an intermediate part that helps interactions between qubits, and generally a variable capacitor between the qubits may be included. However, the superconducting qubit 260 configured to form a Josephson junction using the ferromagnetic body 330 may be directly used as a qubit coupler.

In an example of a typical superconducting qubit, the resonance frequency of the qubit may be controlled by controlling a change in magnetic flux by the control current, and hence the typical superconducting qubit may be susceptible to magnetic flux noise. Also, the typical superconducting qubit may be affected by a geomagnetic field, flux noise from electronic equipment, and the like, which may make it difficult to constantly control the resonance frequency. In contrast, according to an embodiment of the superconducting qubit device of one or more embodiments using a ferromagnetic body, the resonance frequency may be controlled using the movement of the magnetic domain wall by the control current, rather than using the direct change in magnetic flux due to the control current. For example, when a magnetic field greater than or equal to a critical magnetic field is applied to the ferromagnetic body, the superconducting qubit device of one or more embodiments may move the magnetic domain wall in the ferromagnetic body, and may control the corresponding resonance frequency, thereby enabling relatively stable control of magnetic flux and other noise. In addition, the superconducting qubit device of one or more embodiments may not require continuous application of current due to the characteristics of the ferromagnetic body in which the position of the magnetic domain wall does not change even when the application of current stops.

Figure 7:
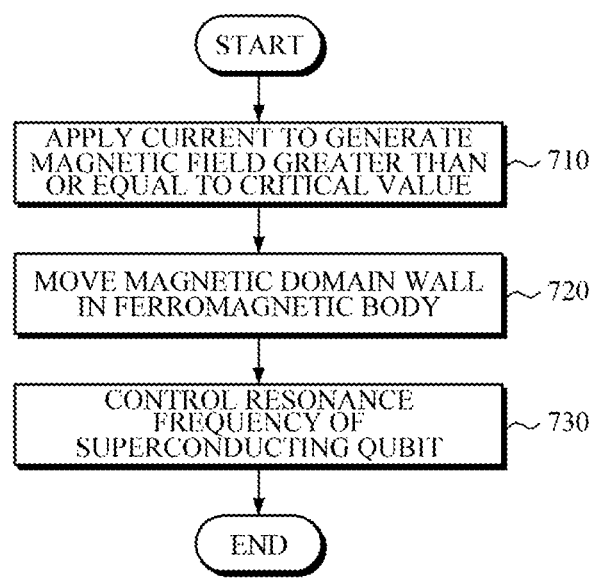
FIG. 7 is a flowchart illustrating a method of controlling a resonance frequency using a superconducting qubit-based device according to an embodiment.

FIG. 7 is a flowchart illustrating a method of controlling a resonance frequency using a superconducting qubit-based device according to an embodiment.

FIG. 7 is an example of a method of controlling a resonance frequency which is performed by the superconducting qubit-based device according to the embodiments of FIGS. 1 to 4, which are described above in detail, and thus will be briefly described below in order to avoid redundancy.

For example, the superconducting qubit-based device may include a superconducting qubit that includes a ferromagnetic body configured to form a Josephson junction with a first conductive pad and a second conductive pad, and a conducting wire.

The superconducting qubit-based device may apply current to the conducting wire such that a magnetic field greater than or equal to a predetermined critical value is generated in 710. The predetermined critical value may be determined according to the type of the ferromagnetic body, and the ferromagnetic body may include at least one of Pt/Co/MgO, Pt/Co/AlOx, Pt/Co/CoFeB/MgO, Pt/(Co/Ni)n, or Pt/(Co/Pt)n, but is not limited thereto. In addition, the superconducting qubit-based device may apply current to the conducting wire such that a magnetic field in the form of a pulse is generated.

The superconducting qubit-based device may move the magnetic domain wall in the ferromagnetic body according to the application of the current in 720, and may control the resonance frequency of the superconducting qubit based thereon in 730. In an example, the superconducting qubit-based device may control the resonance frequency using a model that defines a relationship between a predetermined position of the magnetic domain wall and critical current and a model that defines a relationship between predetermined critical current and the resonance frequency of the superconducting qubit.

While the superconducting qubit using a ferromagnetic body, the superconducting qubit-based device including the same, and the method of controlling a resonance frequency using a superconducting qubit-based device have been particularly shown and described with reference to embodiments thereof, it will be understood by those of ordinary skill that the illustrated embodiments are only examples, and various modifications to the illustrated embodiments and other equivalent embodiments may be possible. Therefore, the example embodiments described herein are to be considered in a descriptive sense only, and not for purposes of limitation The scope of the disclosure is defined not by the detailed description, but by the claims and their equivalents, and all variations within the scope of the claims and their equivalents are to be construed as being included in the disclosure.

The qubit control circuits, readout circuits, control circuits, qubit control circuit 140, readout circuit 130, control circuit 250, and other apparatuses, devices, units, modules, and components disclosed and described herein, including descriptions with respect to respect to FIGS. 1-7, are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result.

In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in, and discussed with respect to, FIGS. 1-7 that perform the operations described in this application are performed by computing hardware, for example, by one or more processors or computers, implemented as described above implementing instructions (e.g., computer or processor/processing device readable instructions) or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RW, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A superconducting qubit-based device, comprising:
a superconducting qubit comprising a first conductive pad and a second conductive pad, each being formed of a superconducting material, and a ferromagnetic body configured to form a Josephson junction with the first conductive pad and the second conductive pad;
a conducting wire spaced apart from the ferromagnetic body by a predetermined distance; and
a control circuit configured to control a resonance frequency of the superconducting qubit by controlling a current flowing through the conducting wire.

2. The device of claim 1, wherein the ferromagnetic body comprises a magnetic domain wall.

3. The device of claim 2, wherein the control circuit is configured to move the magnetic domain wall by controlling the current flowing through the conducting wire to produce a magnetic field greater than or equal to a predetermined critical value.

4. The device of claim 3, wherein the control circuit is configured to control the resonance frequency by generating the magnetic field greater than or equal to the predetermined critical value using a model that defines a relationship between a position of the magnetic domain wall and a critical current and a model that defines a relationship between the critical current and the resonance frequency of the superconducting qubit.

5. The device of claim 3, wherein the control circuit is configured to generate a magnetic field in the form of a pulse by controlling the current flowing through the conducting wire.

6. The device of claim 1, wherein
the conducting wire is spaced apart from the first conductive pad and the second conductive pad by a predetermined distance, and
the conducting wire is positioned between the first conductive pad and the second conductive pad.

7. The device of claim 1, wherein the superconducting material comprises any one or any combination of any two or more of aluminum (Al), niobium (Nb), indium (In), alpha-tantalum ($\alpha$-Ta), titanium (Ti), lead (Pb), vanadium (V), and compounds thereof.

8. The device of claim 1, wherein the ferromagnetic body comprises any one or any combination of any two or more of Pt/Co/MgO, Pt/Co/AlOx, Pt/CoFeB/MgO, Pt/(Co/Ni)n, and Pt/(Co/Pt)n.

9. The device of claim 1, wherein the superconducting qubit is a transmon-type qubit.

10. The device of claim 1, wherein the superconducting qubit is used as a qubit coupler.

11. The device of claim 1, wherein either one or both of the first conductive pad and the second conductive pad has a thickness of 50 nm or more and 400 nm or less.

12. The device of claim 1, wherein the superconducting qubit, the conducting wire, and the control circuit are formed in a layered structure.

13. A method of controlling a resonance frequency using a superconducting qubit-based device, wherein the superconducting qubit-based device comprises a superconducting qubit comprising a ferromagnetic body configured to form a Josephson junction with a first conductive pad and a second conductive pad, and a conducting wire, the method comprising:
applying a current to the conducting wire such that a magnetic field greater than or equal to a predetermined critical value is generated; and
controlling a resonance frequency of the superconducting qubit by moving a magnetic domain wall in the ferromagnetic body according to the application of the current.

14. The method of claim 13, wherein the applying of the current comprises applying the current such that a magnetic field in the form of a pulse is generated.

15. The method of claim 13, wherein the controlling of the resonance frequency comprises controlling the resonance frequency using a model that defines a relationship between a position of the magnetic domain wall and a critical current and a model that defines a relationship between the critical current and the resonance frequency of the superconducting qubit.

16. A superconducting qubit comprising:
- a first conductive pad and a second conductive pad, each being formed of a superconducting material; and
- a ferromagnetic body configured to form a Josephson junction with the first conductive pad and the second conductive pad,
- wherein the ferromagnetic body comprises a magnetic domain wall.

17. The superconducting qubit of claim 16, wherein the magnetic domain wall is moved by a current flowing through a conducting wire spaced apart from the ferromagnetic body by a predetermined distance.

18. The superconducting qubit of claim 17, wherein the magnetic domain wall is moved when an intensity of a magnetic field generated by the current flowing through the conducting wire is greater than or equal to a predetermined critical value.

19. A superconducting qubit-based device, comprising:
- the superconducting qubit of claim 16;
- a conducting wire spaced apart from the ferromagnetic body; and
- a control circuit configured to control a resonance frequency of the superconducting qubit by controlling a current flowing through the conducting wire.

20. The superconducting qubit of claim 16, wherein the magnetic domain wall is movable in the ferromagnetic body.

* * * * *